Oct. 25, 1966  W. H. RUEHLE  3,281,776
GEOPHYSICAL DATA PROCESSING UTILIZING
TIME-VARIABLE FILTERS
Filed Oct. 16, 1963  5 Sheets-Sheet 1

WILLIAM H. RUEHLE  INVENTOR.

BY *William Scherback*

ATTORNEY

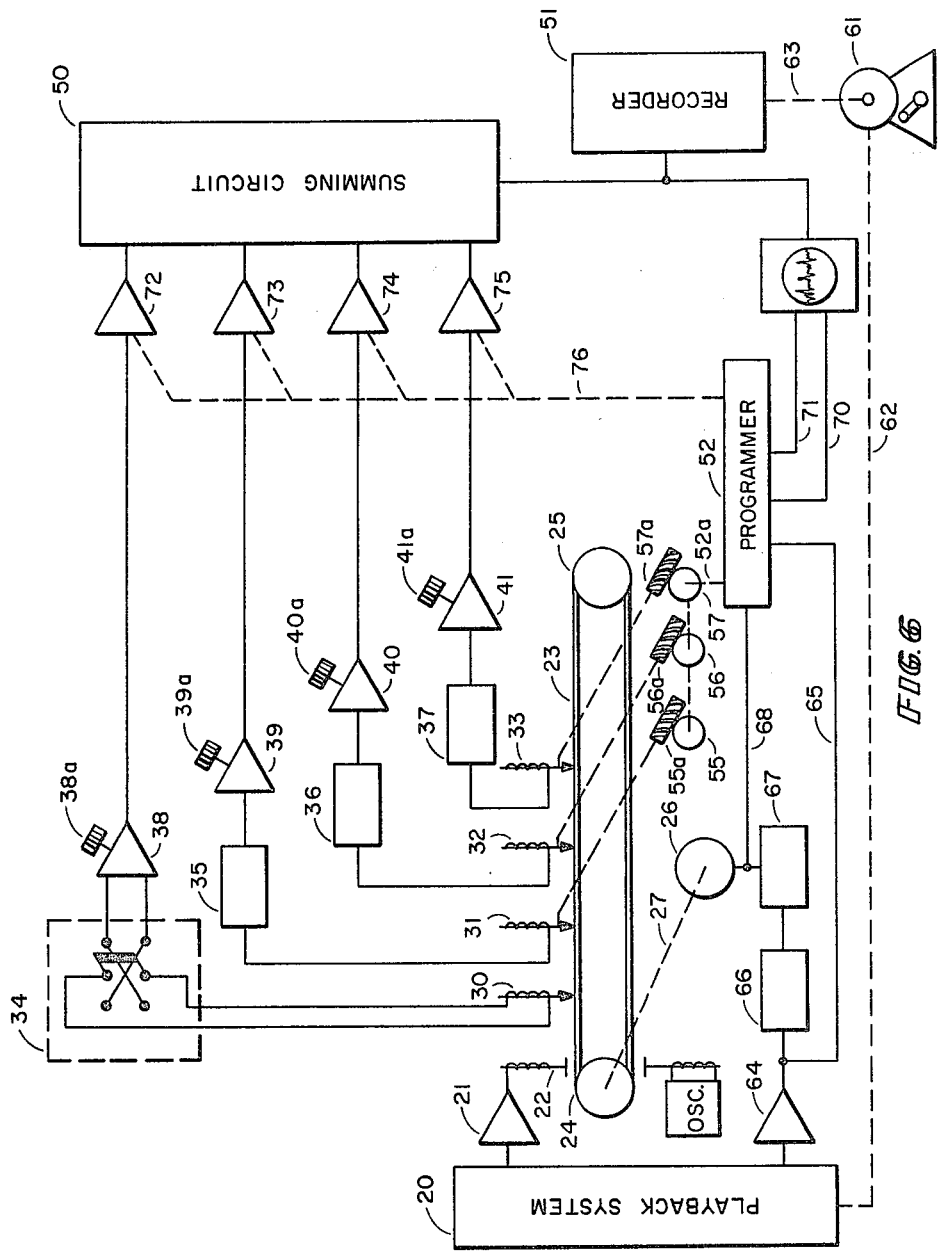

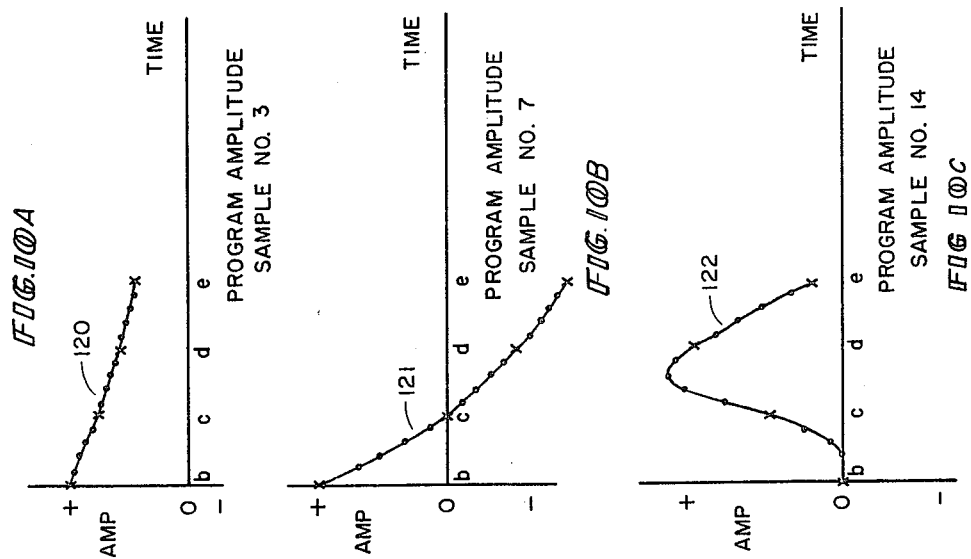
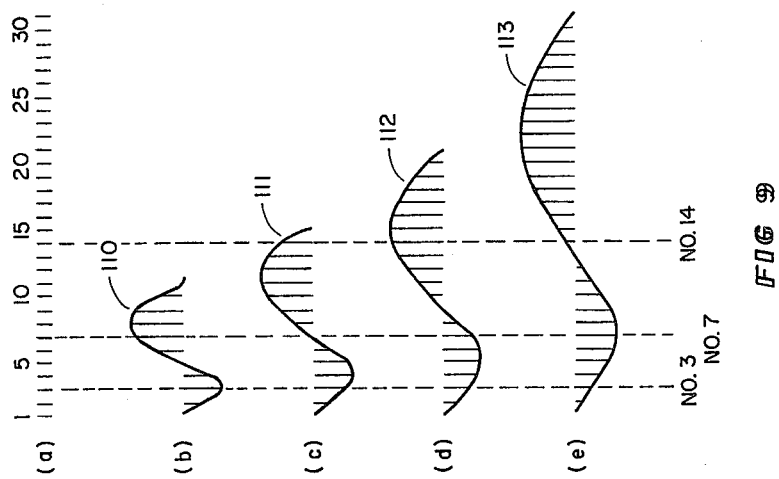

Oct. 25, 1966  
W. H. RUEHLE  
3,281,776  
GEOPHYSICAL DATA PROCESSING UTILIZING  
TIME-VARIABLE FILTERS  
Filed Oct. 16, 1963  
5 Sheets-Sheet 5

WILLIAM H RUEHLE INVENTOR.

BY *Lillian Ackerback*

ATTORNEY

United States Patent Office 3,281,776
Patented Oct. 25, 1966

3,281,776
GEOPHYSICAL DATA PROCESSING UTILIZING
TIME-VARIABLE FILTERS
William H. Ruehle, Dallas, Tex., assignor to Mobil Oil
Corporation, a corporation of New York
Filed Oct. 16, 1963, Ser. No. 316,593
7 Claims. (Cl. 340—15.5)

This invention relates to data processing of geophysically dependent functions and more particularly to methods of and apparatus for improving the character of signal representative of earth characteristics under investigation and has for an object a filter and a filtering technique wherein the filter response varies in manner dependent upon variations in the frequency spectrum of primary information comprising the geophysically dependent function.

In the field of geophysical exploration, records, for example, seismograms, are made which include data representative of such subsurface characteristics as reflecting horizons. It is the practice to proces such records with the objective of enhancing the data. The processing includes techniques generally referred to as filtering. The filtering may be selected either to attenuate such undesirable noise signal as incoherent noise or to amplify the desired data. The task is made difficult by reason of the fact that the earth has a frequency response which changes with depth.

As a result, at least primary seismic data will change in frequency content along the length of the record. For example, early arrivals from near surface reflecting beds are represented by wavelets including relatively high frequency components, whereas later arriving reflections are represented by wavelets of predominantly low frequency components. Therefore, a selected filter good for one portion of the record is almost useless for other portions of the record. This has resulted in the use of compromise filters whose overall effectiveness leaves much to be desired.

In accordance with the present invention, these objectives of enhancing data are accomplished by convolving with a geophysically dependent function an operator whose impulse response varies with time in manner dependent upon change in earth filtering characteristics. This method is performed by use of a time-domain filter which comprises the operator and which is made time variable in order to vary with time its impulse response in accordance with a program based upon variations in the primary signal frequency spectrum.

The invention is particularly suited for data processing of geophysically dependent functions whose frequency spectra are time variable. This includes, of course, primary seismic data and functions which are dependent upon this data.

In accordance with further aspects of the present invention, the undesirable noise signal is substantially eliminated without introduction of distortion to primary information by providing in one embodiment a filter whose character in terms of pass band resembles that of the earth. Stated another way, there is provide a filter whose impulse response changes in manner dependent upon change in earth filtering characteristics.

More particularly in accordance with the present invention, there is provided a method of treating seismic data comprising the steps of generating a function that varies with time as motion of the earth at a seismic detecting station. An operator is established by providing sample points separated by sampling intervals. Each of the sampling points is assigned values of amplitude and polarity, thereby producing a filter having an initial impulse response. The function, or a selected portion thereof, is applied as a whole to the operator; and during the application of the function, the sampling intervals are effectively increased to produce with time a family of filters whose impulse response varies in manner dependent upon the impulse response of the earth traversed by seismic energy represented by the seismic function.

More particularly and further in accordance with the present invention, there is provided a time-variable, time-domain filter comprising a recording means, a recording medium, and a plurality of signal receiving means spaced one from the other by equal, sample spacing increments along direction of movement of the medium. Amplitude and polarity adjusting means are connected with each of the receiving means to determine therewith an impulse response characteristic. The medium is now moved relative to the recording means and to the receiving means. A programming means produces a function which varies monotonically with time and in manner based upon variation in filtering characteristic of the earth formations traversed by the seismic energy productive of the data to be processed by the filter. A means responsive to the output of the programming means varies continuously the impulse response characteristic provided by the receiving means and amplitude and phase adjusting means. The outputs of all the receiving means and amplitude and phase adjusting means are then applied to a suitable summing device.

For further objects and advantages of the present invention, reference now may be had to the following description taken in conjunction with the accompanying drawings wherein:

FIGURE 1 diagrammatically represents variation in frequency characteristic of the earth;

FIGURE 2 diagrammatically illustrates the impulse response at a given moment of a seismic system including the earth;

FIGURES 3A, 4A, and 5A illustrate the change in impulse response of a time-domain filter effected by change in the sampling interval while maintaining the sample amplitude constant;

FIGURES 3B, 4B, and 5B respectively represent the Fourier transform of the impulse responses illustrated in FIGURES 3A, 4A, and 5A;

FIGURE 6 is a diagrammatic representation of a system for carrying out one method of the present invention;

Figure 8:
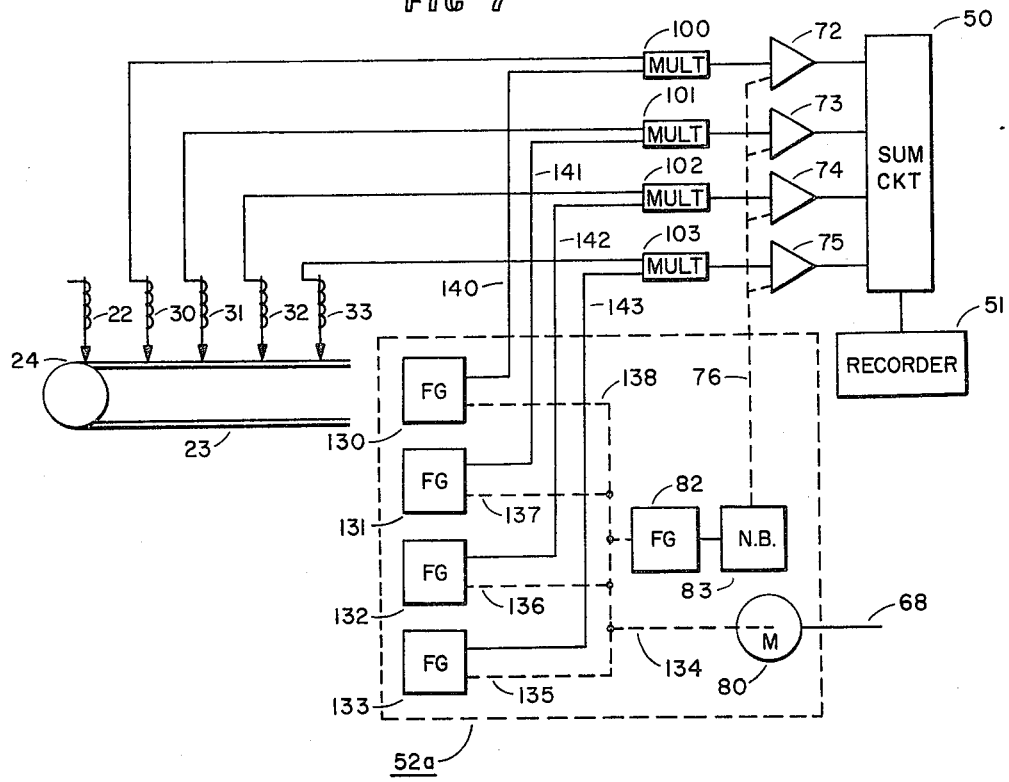
Figure 11:
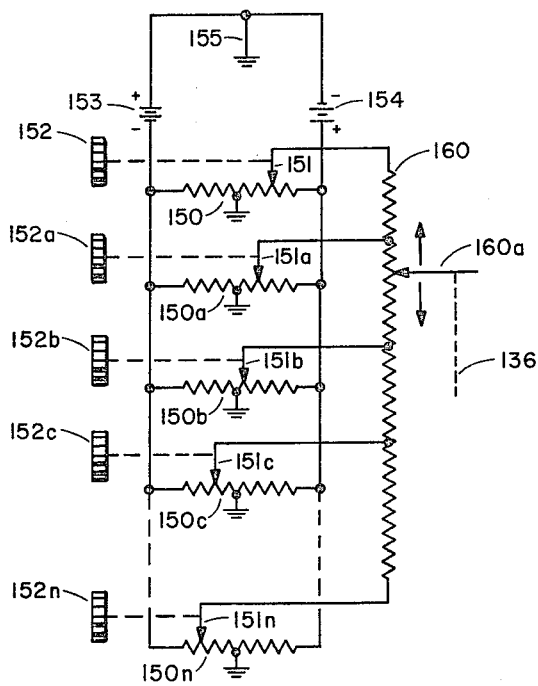
Figure 12:
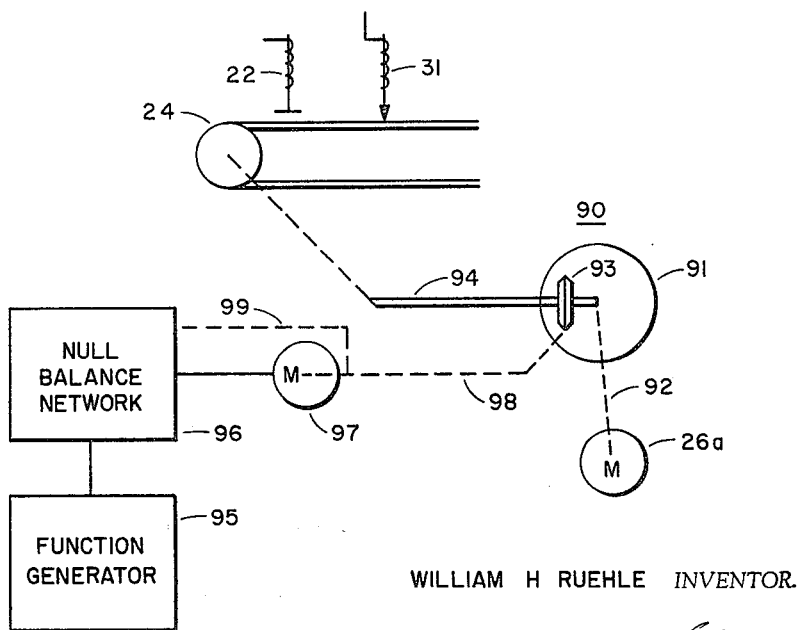

FIGURE 8 diagrammatically represents a portion of a second embodiment of the present invention;

FIGURE 9 diagrammatically represents changes in impulse response effected by maintaining a constant sampling interval while changing the amplitude and polarity of signal from each of a plurality of signal detecting means comprising a time-domain filter;

FIGURES 10A–10C diagrammatically represent the variation with time of the amplitude and the polarity of selected ones of the signal receiving or detecting means illustrated in FIGURE 9;

FIGURE 11 schematically represents a typical function generator useful in producing functions of the character illustrated in FIGURES 10A–10C; and FIGURE 12 schematically represents in part a further modification of the present invention wherein the impulse response of a filter is varied by change in speed with which data passes the signal detecting means comprising the time-domain filter.

The invention now will be described in view of its application to the removal of incoherent noise signals from field seismic records but with the understanding that it is applicable to enhance the primary data of any geophysically dependent variable or function whose frequency spectrum changes with time and is not limited to treatment of randomly occurring or incoherent noise.

Figure 1:
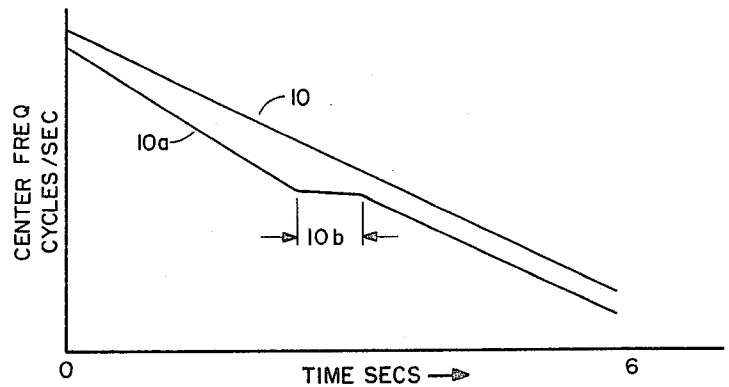

The technique of seismic exploration is well known to those skilled in the art. Briefly, seismic energy is applied at or near the surface of the earth and travels downwardly. Each interface in the earth gives rise to a reflection of energy which is detected by suitable means near the surface of the earth. A typical seismic record will be approximately six seconds in duration. It has been observed that the frequency spectrum of energy arriving early in record time at the surface of the earth is relatively wide band in character. That is to say, it contains both low frequency and high frequency components. Later arriving signals suffer attenuation of the higher frequencies with the result that the signals forming the later portion of the seismic record or trace are primarily low frequency in character. The effect of change in frequency content of a typical seismic record is illustrated in FIGURE 1 by the plot 10 of center frequency in terms of cycles per second versus time in seconds. It will be observed that at zero time, representing the start of the seismic record, the center frequency is fairly high, signifying that the reflections received are relatively wide band in character. The downward slope of the plot 10 indicates a narrowing of the frequency band and a lowering of center frequency with respect to time until at the end of the record at about six seconds the center frequency is very low.

Noise can be removed from a seismic record by designing a filter which sharply will attenuate noise occurring over a given frequency spectrum. However, the use of such filters invariably will also attenuate or distort the character of primary reflections. This undesirable feature of past practice is avoided in accordance with the present invention by applying a geophysically dependent function, such as a seismic trace, to a filter whose frequency characteristic will change with time in manner dependent upon change in the filter characteristic of the earth formations under investigation.

Figure 2:
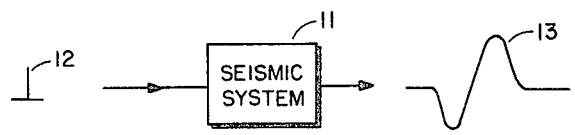

Any system including a seismic system 11 (FIGURE 2) may be characterized by its impulse response, which response is also representative of the frequency characteristics of the system. In practice, the impulse response is derived by applying to the seismic system 11 an impulse 12 which is characterized as being possessed of all frequencies of unit or equal amplitude. The resultant output waveform 13 is the impulse response of the system 11 and represents among other things the pass band of the system.

Figure 3A:
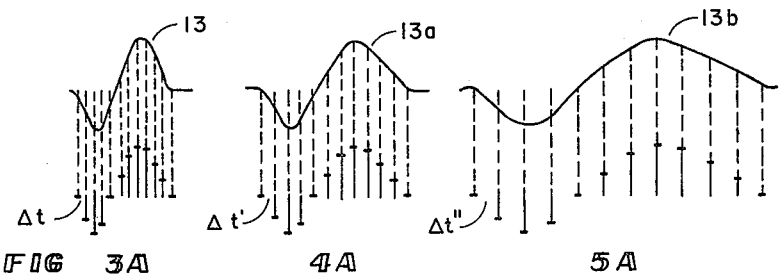
Figure 3B:
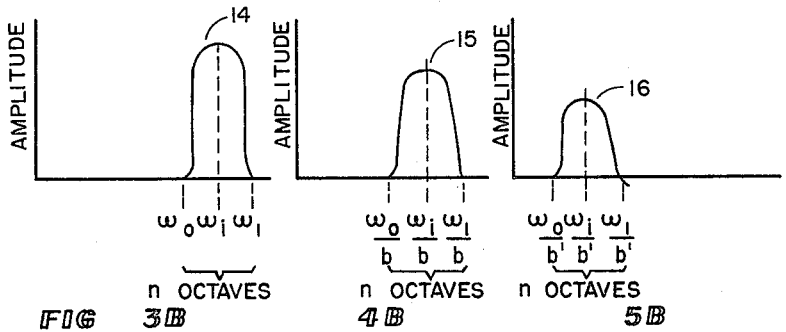

The impulse response of any system may be represented mathematically in the time domain as $f(t)$ and in the frequency domain as $F(j\omega)$. Having knowledge of the impulse response of the system, it may now conveniently be represented in the time domain by well-known sampling techniques. For example, in FIGURE 3A the impulse response 13 of the system 11 is sampled at a number of points separated by a sampling interval $\Delta t$ and each of the samples weighted or ascribed a specific amplitude dependent upon the instantaneous amplitude of the waveform 13 at the particular sampling point as illustrated by the dashed lines and also assigned polarities conforming with the polarity of the waveform. Now, as the center frequency of the frequency response character of the seismic system 11 changes and becomes lower, it can be represented by a second impulse response 13a and represented in the time domain by the same number of samples as in FIGURE 3A and of the same polarity and weighting but with a different sample spacing or sampling interval $\Delta t'$. Likewise, a still lower center frequency characteristic 13b (FIGURE 5A) may be represented in the time domain by a like number of samples of identical polarity and weighting but with yet another and larger sampling interval or sampling spacing $\Delta t''$. As demonstrated by the representations in FIGURES 3A–5A, the effect of a scale change, i.e., a change in sampling interval, is productive of a function that maintains its general shape but is either stretched or shrunk in time. Accordingly, the method of the present invention may be carried out by employing a time-domain filter comprising a plurality of heads spaced one from the other with means which will cause the heads to move in time continuously to effect filters of different band pass whose character closely follows a change dependent upon change in frequency characteristic of the earth.

However, further consideration is necessary and for that purpose it is convenient to investigate that which takes place in the frequency domain. The impulse response 13 (FIGURE 3A) is represented by the function $f(t)$ in the time domain and through Fourier transform by the function $F(j\omega)$ in the frequency domain. The impulse response 13a is represented by the function $f(bt)$ with $b$ representing the increase in sampling interval as illustrated by the spacing $\Delta t'$ (FIGURE 4A). The Fourier transform or frequency domain representation of the impulse response 13a is given by $(1/b)F(j\omega/b)$. Likewise, the impulse response 13b in the time domain is represented by the function $f(b't)$ and its Fourier transform or frequency domain representation as $$(1/b')F(j\omega/b')$$

An analysis in the frequency domain reveals that the Fourier transform representation undergoes a scale change both in frequency and in amplitude dependent upon the values of $b$ and $b'$. However, all symmetry is preserved and the net result is a frequency response curve which changes in amplitude and moves along a frequency axis but encompasses in each instance equal octave increments. This fact is illustrated in FIGURES 3B–5B, respectively representing in the frequency domain the character of the time-domain filters represented in FIGURES 3A–5A. It will be noted that the frequency response curve 14 (FIGURE 3B) has a center frequency at $\omega_1$ and a band width whose opposite ends are represented by frequencies of values $\omega_0$ and $\omega_1$. The frequency response curve 15 (FIGURE 4B) has a center frequency which has been reduced by the factor $1/b$ or $\omega_i/b$ and bound at opposite ends by frequencies $\omega_0/b$ and $\omega_1/b$. The frequency response curve 16 (FIGURE 5B) has a center frequency at $\omega_i/b'$ and a band pass which extends from frequencies of value $\omega_0/b'$ to a frequency of $\omega_1/b'$. Each of the frequency response curves 14–16 covers the same number of octaves, namely, $n$ octaves. Thus, since the sampled response function in the time domain is equivalent to the frequency response function in the frequency domain, if sample amplitudes and polarities are maintained and the sampling interval either increased or decreased, there are produced filters of equivalent octaves covering different portions of the frequency spectrum.

Since the frequency response curves 14, 15, and 16 suffer a loss in amplitude characteristic, it is desirable during the course of the filtering operation to vary the gain concomitantly with change in filter character in order to compensate for such attenuation. More particularly, the adjusting in gain is dependent upon the values of $b$, $b'$, etc. In other words, the larger the sample spacing, the greater the gain adjustment. An excellent approximation as to the nature of the change in gain may be derived by employing a function whose slope is the mirror image of the slope of the plot 10 (FIGURE 1). For example, the gain may be programed to vary linearly beginning at a low value, at time zero, and increasing to a maximum at six seconds.

Having reviewed the theoretical considerations of the present invention, it may be defined as a method of treating geophysically dependent data which would include the generation of a function that varies with time dependent upon the motion of the earth at a seismic detecting station. Sampling intervals are established for sample points for an operator to be employed in the filtering of the function, and values of amplitude and polarity are assigned each of the sampling points. The function is now applied to the operator. Thereafter, and during operation upon the function, the sampling intervals are effectively varied continuously to provide a family of operators, each having a different impulse response; and the result of the operation is recorded as representative of a seismic signal essentially free of undesirable noise.

One system suitable for carrying out a method of the present invention is illustrated in FIGURE 6. The system includes a playback system 20 which may be of the type illustrated and claimed in U.S. Patent 2,950,459, issued to George B. Loper and Robert R. Pittman for Seismic Record Display and Re-Recording. The system 20 repeatedly produces an electrical signal representative of the seismic trace, a geophysically dependent function, which is applied by way of amplifier 21 to a recording means or recording head 22. The signal is recorded on a magnetic medium 23 shown as a continuous belt supported by drums 24 and 25. Drum 24 is driven by a motor 26 through a mechanical connection illustrated by dashed line 27 to move the magnetic belt and apply the signal sequentially to a plurality of receiving means or pickup heads 30, 31, 32, and 33, comprising elements of the time-variable, time-domain filter. Only four pickup heads have been illustrated; however, it is to be understood that many more will be employed, with the ultimate number defined by the complexity of the impulse response and the number of sampling points necessary to define it. Each of the pickup heads 30–33 has associated with it a polarity reversing means 34, 35, 36, and 37 and a weighting means illustrated as amplifiers 38, 39, 40, and 41, the gain of each of which is adjusted through means represented by control knobs 38a, 39a, 40a, and 41a. The character or initial condition of the filter is produced in the following manner. For example, if the filter is to have an impulse response 13 (FIGURE 3A), the filter will be comprised of twelve pickup heads.

The filter response will be set up as follows. The first pickup head, representing the first sample point, will be at zero time. Its polarity adjusting means 34, represented by a double-pole, double-throw switch, may conveniently be place in a normal or positive position and the gain of its associated amplifier 38 set at zero. The second pickup head 31 represents the second sampling point of FIGURE 3A, and its output should be negative. Accordingly, the polarity adjusting means associated therewith is adjusted, or the position of the double-pole, double-throw switch is made such as to produce an output different from that of the switch 34; and the gain of amplifier 39 is adjusted to produce an output representative of the amplitude of the second sample of FIGURE 3A. The outputs from the other pickup heads are similarly adjusted as by manipulation of the polarity determining devices 36, 37 and the gain of amplifiers 40, 41 to produce an operator or filter having twelve sample points each separated by a distance $\Delta t$ and having outputs conforming with the representation of the sampled waveform 13. The outputs from all of the pickup heads and their associated polarity and gain adjusting means are applied to a summing circuit 50; and the output of the summing circuit, the filtered seismogram, can be recorded by a suitable recorder 51.

As the seismic information, or data, is recorded on the moving recording medium 23, the spacing between the pickup heads 30–33 continuously is adjusted under control of programmer 52. The programmer 52 includes a function generator which produces a control signal, either voltage or current, having a characteristic closely approximating and perhaps even identical with the plot 10 of FIGURE 1. The electrical function is converted to mechanical movement to adjust the spacing between the pickup heads as by way of suitable mechanical coupling means which is here represented by a family of gears 55, 56, and 57 and pinions 55a, 56a, and 57a. The gear ratios of the gears and pinions differ one from the other in order to maintain equal spacing between pickup heads as they are moved relative to the recording medium or belt 23. For example, if the gear 55 associated with the second playback head has a ratio with its associated pinion 55a of 1, then the ratio of the gear 56 with respect to its pinion 56a will be 2, etc. This can be generalized by saying that the ratios are determined by the relationship of $n-1$ where $n$ is the sample or playback head number.

Programmer 52 may be of the type illustrated in FIGURE 4A of U.S. Patent 3,075,172 wherein the generation of the control function is begun in time synchronized with the timebreak usually recorded on a seismogram and initiated under control of timing lines to assure that the function is initiated at a time coinciding with the appearance of the seismic information under the first pickup or playback head 30. The programmer 52 also includes a reset control rapidly to return the function to the initial or start position so that there may be provided a continuous playback and filtering of the same seismic information while the filtered result is viewed at the face of an oscilloscope 60 in order to determined visually the correctness of the assumed function as represented by the plot 10 (FIGURE 1).

While it is usually safe to assume that the frequency character of the earth will vary linearly with respect to time, such is not always the case. For example, where a dense and extensive limestsone stratum is encountered, the frequency characteristic remains essentially constant with depth and, as such, adjustment must be made in the function generated by way of the programmer 52 to account for this deviation from linear change. The effect of the extensive limestone upon the change in earth filter characteristic is illustrated by the plot 10a (FIGURE 1) and more particularly by way of the segment 10b thereof.

The operation of the system of FIGURE 6 for repetitive playback and for adjustments in the programmed movementof the pickup heads 30–33 is as follows. The playback system 20 and the recorder 51 are synchronized by employing a common prime mover shown as a variable speed motor 61. The shaft of the motor is coupled respectively to the playback system 20 and to the recorder 51 by way of mechanical linkage shown as dashed lines 62 and 63. The playback system 20 now begins production of electrical signals representative of the geophysically dependent function which is applied by way of the amplifier 21 to the recording head 22 and at the same time begins reproduction of the timebreak and timing lines which are applied by way of amplifier 64 to the programmer 52 by way of conductor 65.

The timing lines are also employed to control the frequency of power applied to the synchronous motor 26. More particularly, the timing lines are applied to the input of a frequency divider 66 and thence to a power amplifier 67 to generate a signal whose frequency is dependent upon the speed of the motor 61. Accordingly, the synchronous motor 26 is now synchronized with the motor 61 and with the playback system 20. The output from the power amplifier 67 is also applied to programmer 52 by way of conductor 68 to control the speed at which the function represented by the plot 10 is generated.

As soon as the timebreak is applied to the programmer 52, a counter is energized and, at a time coinciding with the appearance of the seismic signal under the playback or pickup head 30, initiates the operation of the function generator. At the same time, a control pulse is applied by way of conductor 70 to initiate the horizontal sweep for the cathode-ray oscilloscope 60. At the end of the horizontal sweep corresponding with the playback of the entire seismic trace, the cathode-ray oscilloscope 60 generates a flyback pulse which is applied by way of conductor 71 to the programmer 52 to reset the function generator. This operation continues automatically until a person controlling the operation is satisfied that he has achieved an ultimate program or function for the time-variable, time-domain filter and has produced a desired end result. At this time, the system is cycled once more and the filtered seismic information recorded by the recorder 51.

The programmer 52 may also include a second function generator which generates a function the mirror image of plot 10 (FIGURE 1) in order to control the gain of amplifiers 72, 73, 74, and 75 for purpose of compensating for the attenuation in amplitude of the frequency response curves illustrated in FIGURES 3B–5B. The adjustment in gain of the amplifiers 72–75 may be by way of a gain control potentiometer mechanically coupled to the programmer 72 in manner illustrated by the dashed line 76.

Figure 7:
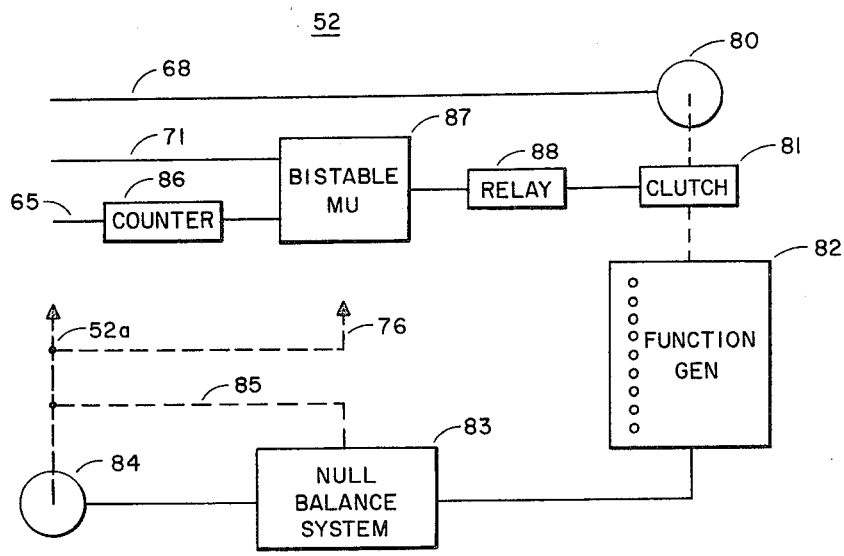
FIGURE 7 illustrates details of the programmer of FIGURE 6.

Some of the major details of programmer 52 are illustrated in FIGURE 7. The programmer 52 is shown comprised of a motor 80 which through clutch 81 drives a function generator 82 productive of a function approximating the plot 10 of FIGURE 1. The motor 80 is a synchronous motor and as previously described is driven at a rate determined by the frequency of signal applied by way of conductor 68 from the power amplifier 67 (FIGURE 6). The output of the function generator 82 is applied to the null balance system 83 to convert the electrical signal into mechanical motion for adjusting the spacing between the pickup heads 30–33 of FIGURE 6 as well as adjustment of the gain of the amplifiers 72–75. More particularly, the input to the null balance system from the function generator may be considered an error signal which is sensed and, in a manner well known to those skilled in the art, is followed as by generating a balance signal which cancels the error signal through a means which includes the balance motor 84 and a mechanical coupling 85. A suitable null balance system is described in U.S. Patent 2,113,164.

In the description of FIGURE 6, it will be recalled that the programmer was described as having two function generators, one designed to provide a function suitable for controlling the spacing between the pickup heads 30–33 and a second function generator for controlling the gain of the amplifiers 72–75. Another arrangement is shown in FIGURE 7 wherein the programmer 52 includes but a single function generator, and the adjustment of the pickup heads and the control of gain are effected respectively by way of mechanical connections 52a and 76. That both operations can be effected through a single function generator will be readily appreciated when one considers that the gain adjustment of an amplifier as by way of a potentiometer is merely dependent upon the wiring of each individual potentiometer and the direction in which the slide wire or movable contact is rotated. Therefore, if we assume that each potentiometer associated with each of the amplifiers 72–74 is initially set at a minimum value, then as the shaft 76 is rotated the gain will be increased in accordance with a program that satisfies compensation of the attenuation in height suffered by each frequency response curve as the center frequency moves toward a lower end of the frequency spectrum.

It will be recalled that the function generator 82 began the generation of a function at a precise time controlled by the output of a counter so that the function will be synchronized with the appearance of seismic information at the pickup head 30 (FIGURE 6). Such a counter, represented by counter 86, is shown in FIGURE 7 as having applied thereto the timebreak pulse and the timing lines from the playback system as by way of conductor 65. When the counter 86 has attained a preset count, it generates a pulse which is applied to trigger a bistable multivibrator 87. A relay 88 is now energized and in turn operates the magnetic clutch 81 to couple the motor 80 to the function generator 82. At the same time, the trigger pulse from the counter is applied by way of conductor 70 to the oscilloscope 60 (FIGURE 6). At the end of the horizontal sweep on the oscilloscope, a flyback pulse is applied by way of conductor 71 to the bistable multivibrator to reset it to its initial condition.

For further details concerning a suitable clutch and relay arrangement, reference should be had to FIGURE 4A of the aforementioned U.S. Patent 3,075,172.

The method of the present invention can also be practiced through the use of time-variable filters by changing in time the time base of the input data. This can be accomplished either in the filter itself or in the playback or reproduction of the primary data. In FIGURE 12 there is illustrated a portion of a system wherein the family of filters of equal octave width are produced by varying the speed at which the data is presented to the pickup heads. In such an arrangement, the physical spacing between the various pickup heads will remain constant and the speed of movement of the recording medium will be controlled or programmed by way of a control function generated by a suitable function generator, and which function again will closely approximate the plot 10 of FIGURE 1. More particularly, there is illustrated in FIGURE 12 an arrangement for driving the pulley 24 from motor 26a by way of a variable drive mechanism 90. The mechanism 90 includes a disk 91 which is driven by a constant speed motor 26a through a mechanical coupling represented by the dashed line 92. A second disk 93 is mounted on a splined shaft 94 and is in frictional contact with the surface of the first disk 91. The rotation of the splined shaft and thence the movement of their recording medium carried by the pulley 24 will be a function of the position of the second disk 93 relative to the center of the first disk 91. The position of the second disk 93 is controlled by the function generated by the function generator 95 which is converted to a mechanical movement by way of a null balance network 96 and a balance motor 97. The shaft of motor 97 is coupled to the second disk 93 through a mechanical arrangement represented by the dashed line 98 and is also coupled back to the null balance network by way of a mechanical arrangement illustrated by dashed line 99 for returning the balance network 96 to a null condition in manner well known to those skilled in the art.

There are many techniques available to those skilled in the art to effect variable speed control of a drum or pulley in response to a selected function. For example, the function produced by the generator 95 may be applied directly to a variable frequency oscillator whose output frequency varies in accordance with the amplitude of the function generated by the generator 95. The output of the variable frequency oscillator may then be applied by way of a suitable power amplifier to a synchronous motor whose speed will vary with variations in output frequency of the oscillator. The motor may then be connected directly to the pulley or drive mechanism for the recording medium.

As thus far described, the methods and apparatus of the present invention have been concerned with varying the sample interval either by physically moving the receiving means or pickup heads or by changing the speed at which the data to be operated upon is moved past the receiving means or pickup heads. There will now be described a technique for carrying out a time-variable, time-domain filtering operation wherein the sample spacing or interval is maintained constant while the amplitude and polarity of the output at each of the sample points are programmed or varied. Such a technique lends itself to operations either in an analog mode or in a digital mode. In the latter case, the operations may be carried out by a properly programmed digital computer such as Model No. 1604 of the Control Data Corporation. The description to follow will be limited to an analog system; however, such description will immediately suggest to those skilled in the art of computer programming the technique for carrying out this embodiment of the present invention with a digital computer.

Referring now to FIGURE 8, there is illustrated a portion of an analog system for carrying out a time-variable, time-domain filtering operation upon geophysically dependent data. As in the previously described embodiments, the data initially is recorded by way of recording head 22 upon the recording medium 23 and carried to each of a plurality of receiving means or pickup heads 30–33. However, in this case the recording medium will be driven at a constant speed and the pickup heads or sampling points 30–33 will be maintained at a fixed sampling interval. The amplitude and polarity of each of the sampling points are controlled by a function generator 52a in conjunction with a series of multipliers 100, 101, 102, and 104. Each sample is then applied by way of its respective amplifiers 72, 73, 74, and 75 to a summing circuit 50 and thence to a recorder 51.

The effect of programming each individual sample point to provide a family of filters of varying impulse response is best understood by reference to FIGURE 9 where, for purposes of discussion, thirty sample points equally spaced have been illustrated at line $a$ in the figure. Immediately below the sample points are a family of wavelets 110, 111, 112, and 113, each representing a change in impulse response with respect to time. The first impulse response 110, representing the initial impulse of the time-variable filter, is shown to be comprised of the thirty sample points, each of which has been ascribed values of polarity and magnitude to define the impulse response characteristic as represented by the waveform 110. Now, as time increases, the programmer 52a of FIGURE 8 is effective to ascribe different values of amplitude and, if necessary, polarity to the sample points to produce, for example, the impulse response 111 shown at time $c$. The operation continues with time to produce at time $d$ the impulse response 112 and ultimately at time $e$, representing the end of filtering time interval, the impulse response or waveform 113. In order to produce this family of filters, it is necessary to associate with each of the sampling points its own function generator. Thus, for example, with sample point No. 3 there will be associated a function generator which will produce a control signal, such as the trace 120 in FIGURE 10A, which defines the output of sample point No. 3 as being positive at all times but having an amplitude that decreases with time. The plot of the trace 120 is derived from the impulse response characteristics 110–113 of sample point No. 3 at times $b$, $c$, $d$, and $e$. The function generator associated, for example, with sample point No. 7 will have an output function that varies as trace 121 of FIGURE 10B. Sample point No. 7 therefore will have a positive output decreasing with time until time $c$ and a negative-increasing output from time $c$ through time $e$. The character of the output of the function generator associated with the sample point No. 14 is represented by trace 122 (FIGURE 10C) and is derived by taking the values of sample point No. 14 from each of the impulse response waveforms 110, 111, 112, and 113 at time $b$–$e$.

The function generators necessary for providing the control of amplitude and polarity for each of the sample points are represented in the programmer 52a of FIGURE 8 by the function generators 130, 131, 132, and 133. The number of function generators, as aforesaid, will correspond with the total number of sample points for defining the various filters. However, for purpose of simplicity, only four sample points and four function generators have been represented in FIGURE 8. Each of the function generators is driven by a synchronous motor 80 whose speed will be controlled by the frequency of power applied by way of conductor 68 in the manner described in conjunction with the embodiment of FIGURE 6. The motor 80 is mechanically coupled to each of the function generators 130–133 by way of suitable connections represented by dashed lines 134, 135, 136, 137, and 138.

The outputs from each of the function generators 130–133 are applied respectively by way of conductors 140–143 to the multipliers 100–103 for modification of the amplitude and polarity of output from each of the sample points 30–33. The multipliers 100–103 are of the four-quadrant type which are devices that accept plus or minus for both quantities to be multiplied and produce a product with the correct sign. Suitable four-quadrant multipliers are described in Handbook of Automation, Computation, and Control by Grabbe, Ramo, and Wooldridge, volume 2, chapter 23, beginning at page 23–01. The text is published by John Wiley & Sons, Inc.

If desired, the amplifiers 72–75 together with the function generator 82 and null balance system 83 may be employed to compensate for loss in amplitude of the frequency response curves of each of the filters. In the alternative, the amplifiers 72–75 may be supplanted by multipliers of the same type as the multipliers 100–103 and the output of the function generator 82 applied directly to one of the inputs of the multipliers. The function generators 130–133 may also be modified to produce functions that include the multiplication provided by the function generator 82 and the amplifiers 72–75.

Function generators of the type necessary to perform the functions or to produce output functions of the type necessary in the embodiment of FIGURE 8 are well known to those skilled in the art. One suitable form of function generator has been illustrated in FIGURE 11.

The function generator 132 (FIGURE 11) is comprised of a plurality of parallel-connected slide wires or potentiometers 150, 150a, 150b, 150c, and 150n. Movable contacts 151, 151a, 151b, 151c, and 151n are connected to selected points along a main slide wire or potentiometer 160 from which the output of the function generator is derived. The character of the function to be generated is determined by the positions of the contacts 151–151n with respect to their respective slide wires. The contacts 151–151n are shown adjustable by way of knobs 152, 152a, 152b, 152c, and 152n. The voltage variation between each of the selected points along the main slide wire 160 is linear. Accordingly, the function produced is comprised of a series of linear segments; and therefore the more slide wires or potentiometers 150 employed the more the output function will approximate a continuous curve. The function generator 132 is supplied from two sources of direct current represented by the batteries 153 and 154, having opposite poles connected to the ends of the slide wires 150–150n. With each of the slide wires having its center tap grounded and a ground provided at point 155 in the circuit, it is possible with the adjustment of each slide wire 150–150n to derive a voltage of predetermined amplitude and polarity. Thus, for example, having established what the function produced by the function generator 132 should be, it is a simple matter to make the necessary adjustments as by manipulation of the knobs 152–152n for approximation of such function, for example, that of any one of the curves 120–122 (FIGURES 10A–10C), and to drive the movable contact 160a of the main slide wire 160 by way of mechanical connection 136 to produce the desired control both in amplitude and polarity of a selected sample point.

Now that several embodiments of the present invention have been described both with respect to method and apparatus in both the analog and digital mode, other modifications will suggest themselves to those skilled in the art; and it is intended to cover such modifications as fall within the scope of the appended claims.

What is claimed is:

1. A method of treating seismic data, comprising the steps of:
    (a) generating a function that varies with times as motion of the earth at a seismic detecting station,
    (b) establishing sampling points separated by sampling intervals for an operator to be employed in the filtering of the seismic function, (c) assigning to said operator at each of said sampling points values of amplitude and polarity, thereby producing a filter having an initial impulse response, and
(d) applying as a whole to said operator said seismic function and, during the application of said seismic function, increasing equally each of said sampling intervals to produce with time filters whose impulse response varies as the impulse response of the earth traversed by seismic energy represented by said function.

2. A method of treating seismic data, comprising the steps of:
   (a) generating a function that varies with time as motion of the earth at a sesimic detecting station,
   (b) establishing sampling intervals for an operator to be employed in the filtering of the seismic function,
   (c) assigning values of amplitude and polarity at each sampling interval to define a first operator,
   (d) applying as a whole said seismic function to said first operator, and
   (e) thereafter during the operation upon said seismic function, while maintaining the sampling interval constant, varying the amplitude and polarity of the components of the first operator at each sampling interval to produce with time a series of operators whose impulse response varies in manner related to the impulse response of the earth traversed by seismic energy represented by said function.

3. A method of treating seismic data, comprising the steps of:
   (a) generating a function that varies with time as motion of the earth at a seismic detecting station,
   (b) establishing sampling intervals for an operator to be employed in the filtering of the seismic function,
   (c) assigning values of amplitude and polarity at each sampling interval to define a first operator,
   (d) applying as a whole said seismic function to said first operator, and
   (e) thereafter during the operation upon said seismic function, while maintaining the sampling interval constant, varying the amplitude and polarity of the components of the first operator at each sampling interval to produce with time a series of operators, each having a different impulse response.

4. The method of claim 3 wherein the impulse response of said operator is varied monotonically with time in equal octave increments.

5. The method of claim 3 wherein the impulse response of said operator is varied monotonically with time dependent upon change in earth filtering characteristics.

6. The method of claim 3 wherein the impulse response of said operator is varied monotonically with time in equal octave increments dependent upon change in earth filtering characteristics.

7. The method of claim 3 wherein the impulse response of said operator is varied monotonically with time over equal octave increments and whose frequency response decreases with time as a function of change in earth filtering characteristics.

References Cited by the Examiner
UNITED STATES PATENTS

| | | | |
|---|---|---|---|
| 2,989,726 | 6/1961 | Crawford et al. | 340—3 |
| 3,039,079 | 6/1962 | Walters et al. | 340—6 |
| 3,075,172 | 1/1963 | Loper et al. | 340—15.5 |
| 3,167,738 | 1/1965 | Westerfield | 340—3 |

References Cited by the Applicant
UNITED STATES PATENTS

| | | |
|---|---|---|
| 2,590,822 | 3/1952 | Minton. |
| 2,867,775 | 1/1959 | Groenendyke. |
| 3,011,582 | 12/1961 | Peterson. |

BENJAMIN A. BORCHELT, *Primary Examiner.*

R. M. SKOLNIK, *Assistant Examiner.*